Oct. 24, 1933.       G. H. KOCH       1,932,042
WELDOMATIC OSCILLATOR
Filed May 16, 1931
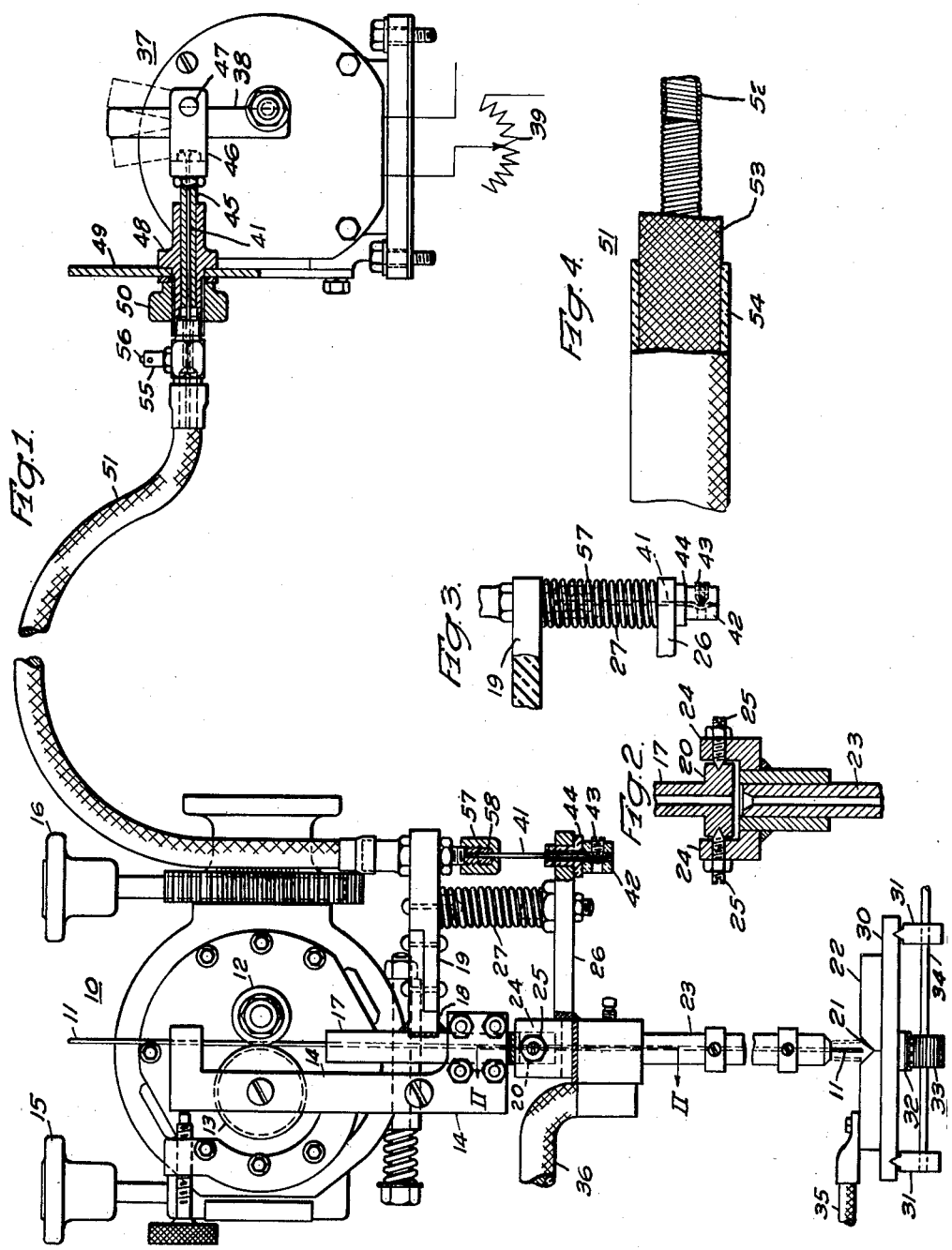
WITNESSES.
INVENTOR
Gustov H. Koch.
BY
ATTORNEY Patented Oct. 24, 1933

1,932,042

UNITED STATES PATENT OFFICE 1,932,042

WELDOMATIC OSCILLATOR

Gustav H. Koch, Salem, Ohio, assignor to Westinghouse Electric & Manufacturing Company, a corporation of Pennsylvania Application May 16, 1931. Serial No. 537,820

23 Claims. (Cl. 219—8)

My invention relates, generally, to arc welding apparatus, and more particularly, to automatic arc welding apparatus provided with electrode-oscillating mechanisms.

The object of my invention, generally stated, is to provide an oscillator mechanism for welding apparatus which shall be simple and efficient in operation and economical to manufacture and use.

A more specific object of my invention is to provide for applying an oscillatory motion to a welding nozzle without transmitting it to the nozzle support.

A further object of my invention is to provide for oscillating a welding nozzle in a predetermined manner from a remote location without imposing reactive forces upon the welding head tending to interfere with or impair its functioning.

Other objects of the invention will, in part be obvious and, in part, appear hereinafter.

The invention, accordingly, is disclosed in the embodiment hereof shown in the accompanying drawing, and comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a view, in side elevation, of an electrode-oscillator mechanism and a welding head embodying the principal features of my invention, parts being broken away to show the relation between the force-transmitting members more clearly.

Fig. 2 is a sectional view, along the lines II—II of Fig. 1, of the pivotal connection between the welding nozzle and the supporting member.

Fig. 3 is a side view, in elevation, of a modified arrangement of the biasing spring, and Fig. 4 is a sectional view of the tube that connects the oscillator mechanism to the welding head.

Referring now to the drawing, 10 designates, generally, a welding head for feeding a welding electrode 11. In order to feed the welding electrode, a feed roller 12 is disposed to cooperate with an idler roller 13 which is carried by a pivoted clamping member 14. The welding head 10 may be adjusted to any desired position about its longitudinal and transverse axes by means of the hand wheels 15 and 16, respectively. Since the welding head shown in connection with this invention is fully described in my copending application, Serial No. 503,402, filed December 19, 1930, and assigned to the Westinghouse Electric and Manufacturing Company, it is not deemed necessary to describe it further in this specification.

As will be noted, a support member 17 is carried by the clamping member 14 and has attached thereto, at right angles, a short arm 18 to which is secured, in any suitable manner, an insulating guide arm 19. While the support member 17 is illustrated as having a rectangular cross section for mounting in the clamping member 14, it will be readily understood that it may be of cylindrical or any other desired shape in order to provide a greater range of angular adjustment. The support member 17 is provided with a T shaped section 20 which is more clearly shown in Fig. 2.

In order to guide the welding electrode 11 to a joint 21 between the abutting edges of the work 22, an electrode nozzle 23, which may be constructed of any suitable material, such as copper, is provided. As shown in the drawing, the nozzle 23 may be pivotally attached to the support member 17 in any suitable manner, as by the provision of projecting arms 24 having pivot pins 25 located therein for engagement with suitable recesses provided in the T shaped section 20 of the support member 17. As illustrated, an actuating arm 26 is attached at right angles to the nozzle 23 to provide for moving it relative to the welding head. In addition, a compression spring 27 is provided between the insulated arm 19 and the actuating arm 26 to bias them apart.

The work 22 may be moved to make a continuous weld by any suitable means, such as the provision of a slidable table 30 which may be carried by slide rails 31. In order to move the table 30, a rack 32 is provided on the underside of the table for cooperation with a pinion 33 mounted on a shaft 34. The shaft 34 may be rotated by any suitable means to cause the table 30 to move along the slide rails 31.

Current for maintaining an arc between the electrode 11 and the work 22 may be supplied from any suitable source of power to the conductors 35 and 36 which are connected, as shown, to the work 22 and the welding nozzle 23, respectively.

As will be readily seen from the drawing, the diameter of the welding electrode 11 is small in comparison to the width of the joint 21, along which a seam is to be welded. Therefore, it is necessary to oscillate the electrode to the dotted positions on either side of the joint to extend the area affected during the welding operation.

In order that the welding head 10 may be maintained in any predetermined position, it is desirable that the means utilized for oscillating the welding nozzle 23 shall produce substantially no turning moment about either the longitudinal or the transverse axis of the welding head. It is also desirable to provide an oscillating means for the welding nozzle that may be located at some distance from the welding head in order that interference with the operation of the welding head may be reduced to a minimum.

With a view to oscillating the welding nozzle 23 with a minimum of interference with the welding head 10, a motor-operated oscillator device 37 is provided. As shown, the oscillator device is provided with an actuating arm 38 which is disposed to oscillate through a predetermined angle of rotation, as indicated by the dotted positions of the arm.

The rate at which the actuating arm 38 is oscillated by the driving motor of the device 37 may be controlled by any suitable means, such as the provision of a rheostat 39 connected, as shown, in the supply circuit for the motor. Since any suitable motor-operated mechanism, well known in the art, may be used for actuating the oscillating arm 38, it has been deemed unnecessary to illustrate and describe the mechanism in detail in this specification.

In order to transmit the oscillatory motion of the arm 38 to the welding nozzle 23, a tension wire 41, preferably of steel, is provided. One end of the tension wire is attached, by means of a clamp 42, to the actuating arm 26. Positive engagement of the clamp 42 with the wire 41 is provided by means of a set-screw 43. An insulating bushing 44, located as shown, prevents electrical contact of the wire 41 with the actuating arm 26.

The other end of the tension wire 41 passes through a plunger 45 and is attached to a yoke 46 having a slotted pin 47, positioned therein, as shown, to cooperate with the actuating arm 38.

In order to vary the length of the oscillation of the welding nozzle 23, the plunger 45 is slidably supported in a threaded guide sleeve 48 which may be adjustably positioned in a slotted bracket 49 that is attached to the frame of the oscillator device 37. As may be seen from the drawing, the guide sleeve 48 is rigidly maintained in any desired position by means of a suitable lock nut 50 disposed in threaded engagement with the guide sleeve.

A tube 51, of both flexible and resilient nature, is provided to transmit the reaction force of the biasing spring 27 on the insulated arm 19, to the bracket 49 in opposition to the pull of the tension wire 41 passing therethrough. As shown, the tube 51 is attached, at one end, to the guide sleeve 48 and, at the other end, to the insulated arm 19.

A specific embodiment of the tube 51 is shown in Fig. 4 which comprises a closely wound spiral spring 52 at the center, surrounded by a layer of flexible wire 53 and arranged in a well known manner. In order to prevent abrasion of the layer of flexible wire 53, an insulating covering 54 surrounds the tube throughout its entire length. It will be readily understood that the tube 51 provides a certain degree of flexibility in the positioning of the oscillator device 37, relative to the welding head 10, and, further, that it provides for transmitting the compressive force set up by the biasing spring 27 to the bracket 49.

In order to reduce the friction between the tension wire 41 and the spiral spring 52 and to prolong the life of each, lubricant is supplied to the tube 51 through the bushing 55, which is provided with a spring pressed ball 56 at its upper opening. The loss of the lubricant from the lower end of the tube 51 is prevented by means of a cap 57 having packing 58 located therein, as shown.

The compression or biasing spring 27 may also be located with respect to the wire 41 as illustrated in Fig. 3. In this modification, all of the reactive force set up by the biasing spring 25 is transmitted directly, through the tube 51, to the bracket 49, and, consequently, there is no turning moment produced about either the transverse or the longitudinal axis of the welding head 10. From a consideration of Fig. 3, it will be readily seen that the connection of the guide arm 19 could be severed from the arm 18 and that satisfactory operation of the oscillator would still be obtained, provided some means were supplied for maintaining the tube 51 in the proper alignment. However, it is necessary to provide for maintaining the tube in alignment with the arm 26 and, therefore, the guide arm 19 is provided, as hereinbefore set forth.

Since it is desirable to utilize the guide arm 19, the compression spring 27 is so positioned, as shown in Fig. 1, as to maintain the pivot pins 25 in close contact with the T shaped section 20 of the support member 17 at all times, even though they become worn or out of adjustment. The turning moment that is produced by the eccentric positioning of the spring 27 about the longitudinal and transverse axes of the welding head 10 may be tolerated because it is relatively slight, and, further, because of the construction of the welding head, as set forth in the copending application referred to hereinbefore.

In operation, the work 22 is moved relative to the head 10, and the electrode 11 is fed to maintain the welding arc at the joint 21. The motor-operated oscillator device 37 is energized, and the nozzle 23 and electrode 11 are oscillated across the joint 21. It will be readily seen that a satisfactory weld may be made with great rapidity.

In order to adjust the rate at which the nozzle 23 is oscillated across the joint, the rheostat 39 is so adjusted as to cause the oscillator device 37 to operate at the desired speed. Thus, the number of oscillations of the welding nozzle may be varied over a wide range, such as from twenty-five to three hundred oscillations per minute, by providing suitable control means for the motor.

As will be readily understood, it is desirable to adjust the length of the oscillation of the nozzle 23 when joints of different widths are to be welded. The length of the oscillation may be readily adjusted by loosening the lock nut 50 and moving the guide sleeve 48 and the yoke 46 upwardly or downwardly to change the effective length of the actuating arm 38, and thereby, either increase or decrease the length of the oscillation.

If it is desired to move the work 22 at right angles to the direction that it is moved, as illustrated in the drawing, the nozzle 23 may still be oscillated across the joint 21, when the work is moved in this direction, by removing the support member 17 from the clamp 14 and turning it at right angles to the position shown in the drawing. The support member 17 may then be clamped in the new position, and the operation of the oscillator mechanism will be as set forth, hereinbefore.

It will be readily seen that the tension wire 41 may be replaced by a compression member and that the compression spring 27 may be replaced by a tension spring. The guide arm 19 and the actuating arm 26 would then be biased toward each other. However, the operation of the oscillator, under these conditions, would be substantially as set forth above.

Since certain changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. In arc welding apparatus in which a welding electrode is fed to work on which a welding operation is to be performed, the combination of a pivotally mounted welding nozzle for guiding the welding electrode, and means operative independently of the electrode feeding means and reacting only on the nozzle for oscillating it across the work.

2. In arc welding apparatus in which an arc is maintained between an electrode and work on which a welding operation is to be performed, the combination of feeding means for the electrode, guiding means for the electrode carried by the feeding means, and actuating means operative independently of the electrode feeding means for moving the guiding means relative to the feeding means and to the work to extend the area affected by the arc, said actuating means characterized by the fact that it imposes substantially no reactive stress on the feeding means.

3. In arc welding apparatus in which a welding electrode is fed by a welding head to work which is moved relative thereto, in combination, guiding means for the electrode carried by the welding head, and actuating means operative independently of the welding head for moving the guiding means relative to the welding head and to the work, said actuating means being characterized by imposing substantially no reactive stress on the welding head.

4. The combination, with arc welding apparatus comprising a welding head disposed to feed a welding electrode to work having abutting edges along which a seam is to be welded and means for maintaining an arc between the electrode and the work, of a nozzle pivotally carried by the welding head for guiding the electrode to the work, and actuating means operative independently of the welding head for oscillating the welding nozzle relative to the welding head and to the work to extend the area affected by the arc.

5. Arc welding apparatus comprising, in combination, a welding head for feeding an electrode to work on which a welding operation is to be performed, a circuit for maintaining an arc between the electrode and the work, guiding means for the electrode pivotally carried by the welding head, independently-operable means for oscillating the guiding means to extend the area affected by the arc, and flexible means for transmitting the actuating force from said independently-operable means to the guiding means.

6. In automatic arc welding apparatus, in combination, a welding head for feeding a welding electrode to work on which a welding operation is to be performed, a circuit for maintaining an arc between the electrode and the work, a nozzle pivotally carried by the welding head for guiding the electrode to the work, means for biasing the nozzle to a predetermined position, and actuating means operative independently of the welding head for moving the nozzle against the force of the biasing means and relative to the welding head and to the work to extend the area affected by the arc, said actuating means being disposed to transmit the actuating force direct to the nozzle without imposing a reactive force on the welding head.

7. The combination with a welding head having a pivotally-mounted nozzle for guiding a welding electrode, of a pivoted arm, motor means for actuating the arm and means interposed between the arm and the welding head for transmitting the movement of the arm to the nozzle while substantially no reactive stress is imposed on the welding head.

8. In automatic arc welding apparatus, in combination, a welding head provided with a pivotally mounted electrode holder, operating means for moving the electrode holder in a predetermined manner, a flexible tube disposed between the welding head and the operating means, and flexible means disposed within the flexible tube and connected to transmit the actuating force from the operating means to the electrode holder.

9. Automatic arc welding apparatus having means for feeding a welding electrode to work on which a welding operation is to be performed, and independently-actuated means for oscillating the welding electrode across the work characterized by the fact that means are provided for independently adjusting the rate and amplitude of the oscillation.

10. In arc welding apparatus, the combination with a welding head, of a welding nozzle pivotally mounted on the welding head, means independent of the welding head for oscillating the welding nozzle characterized by the provision of means for transmitting power from the independent means direct to the welding nozzle without imposing a reactive force on the welding head, and means for adjusting the rate and amplitude of the oscillation.

11. Arc welding apparatus comprising, in combination, a welding head for feeding a welding electrode to work having abutting edges along which a seam is to be welded, a welding circuit for maintaining an arc between the electrode and the work, a support member, means for adjustably clamping the support member to the welding head, a nozzle pivotally carried by the support member for guiding the welding electrode to the seam, and independently-actuated means for oscillating the welding nozzle relative to the work and to the welding head to extend the area affected by the arc.

12. A mechanical oscillator for use in arc welding apparatus comprising, in combination, a support member, a nozzle pivotally carried by the support member, a guide arm extending from the support member, an actuating arm extending from the nozzle in the same direction as the guide arm, a resilient member disposed between the guide arm and the actuating arm for biasing the nozzle to a predetermined position, and means for oscillating the nozzle relative to the support member while substantially no reactive force is applied to the support member.

13. A mechanical oscillator for use in arc welding apparatus comprising, in combination, a support member, a nozzle pivotally carried by the support member, a guide arm extending from the support member, an actuating arm extending from the nozzle in the same direction as the guide arm, a resilient member located between the guide arm and the actuating arm for biasing the nozzle to a predetermined position, a motor for oscillating the nozzle, and means for transmitting the oscillating force from the motor to the nozzle while substantially no reactive force is applied to the support member.

14. An automatic oscillator for use with automatic arc welding apparatus in which a welding electrode is fed through a nozzle pivotally carried by a feeding mechanism, comprising, in combination, a separately mounted motor disposed to oscillate an actuating lever, a guide member attached to the motor, a guide arm attached to the feeding mechanism, a flexible tube connected between the guide member and the guide arm, an actuating arm carried by the nozzle, a spring located between the guide arm and the actuating arm to bias the nozzle to a predetermined position, and a tension wire disposed within the tube and attached to the actuating arm and to the actuating lever to oscillate the nozzle on movement of the actuating lever by the motor.

15. In automatic arc welding apparatus, the combination of a pivotally-mounted welding nozzle having an arm projecting therefrom, a welding head disposed to feed a welding electrode through the welding nozzle and having an arm projecting therefrom, a resilient member located between said arms and disposed to bias them in opposite directions, a flexible tube carried at one end by the second named arm, a bracket disposed to carry the other end of the tube, a tension wire attached to the first named arm and extending through the tube, clamping means for attaching the other end of the tension wire to an oscillating arm, and a motor disposed to oscillate the last named arm.

16. Arc welding apparatus comprising, in combination, a welding head for feeding a welding electrode to work having abutting edges along which a seam is to be welded, a circuit for maintaining an arc between the electrode and the work, a support member adjustably carried by the welding head, a guide arm extending from the support member, a nozzle pivotally carried by the support member for guiding the electrode to the work, an actuating arm extending from the nozzle in the same direction as the guide arm, a resilient member disposed between the guide arm and the actuating arm to bias the welding nozzle to a predetermined position, and separately-mounted means for cooperating with the resilient member to oscillate the nozzle and the electrode across the seam to extend the area affected by the arc.

17. Arc welding apparatus comprising, in combination, a welding head for feeding a welding electrode to work having abutting edges along which a seam is to be welded, a circuit for maintaining an arc between the electrode and the work, a support member adjustably carried by the welding head, a guide arm extending from the support member, a nozzle pivotally carried by the support member for guiding the electrode to the work, an actuating arm extending from the nozzle and in the same direction as the guide arm, a resilient member located between the guide arm and the actuating arm to bias the welding nozzle to a predetermined position, a flexible resilient tube carried at one end by the guide arm, a bracket disposed to carry the other end of the tube, a tension wire attached to the second named arm and extending through the tube, an oscillating arm, clamping means for attaching the other end of the tension wire to the oscillating arm, and a motor disposed to oscillate the oscillating arm.

18. Automatic arc welding apparatus comprising, in combination, a welding head for feeding a welding electrode to work that is moved relative thereto, a circuit for maintaining an arc between the electrode and the work, means for adjusting the position of the welding head about a transverse axis, means for adjusting the position of the welding head about a longitudinal axis, a nozzle for guiding the electrode to the work pivotally carried by the welding head, and means for oscillating the nozzle relative to the welding head and to the work to extend the area affected by the arc, said means characterized by the fact that substantially no turning moment is applied to the welding head about either the transverse or the longitudinal axis.

19. Automatic arc welding apparatus comprising, in combination, a welding head for feeding a welding electrode to work that is moved relative thereto, a circuit for maintaining an arc between the electrode and the work, means for adjusting the position of the welding head about a transverse axis, means for adjusting the position of the welding head about a longitudinal axis, a nozzle for guiding the electrode to the work pivotally carried by the welding head, means for biasing the nozzle to a predetermined position and means cooperating with the biasing means for oscillating the nozzle relative to the welding head and to the work to extend the area affected by the arc, said means characterized by the fact that substantially no turning moment is applied to the welding head about either the transverse or the longitudinal axis.

20. Automatic arc welding apparatus comprising, in combination, a welding head for feeding a welding electrode to work that is moved relative thereto, a circuit for maintaining an arc between the electrode and the work, means for adjusting the position of the welding head about a transverse axis, means for adjusting the position of the welding head about a longitudinal axis, a nozzle for guiding the electrode to the work pivotally carried by the welding head, means for biasing the nozzle to a predetermined position, a motor cooperating with the biasing means for oscillating the nozzle relative to the welding head and to the work to extend the area affected by the arc, and means for transmitting the oscillating motion from the motor to the nozzle, said last named means characterized by the fact that substantially no turning moment is applied to the welding head about either the transverse or the longitudinal axis.

21. Automatic arc welding apparatus comprising, in combination, a welding head for feeding a welding electrode to work that is moved relative thereto, a circuit for maintaining an arc between the electrode and the work, means for adjusting the position of the welding head about a transverse axis, means for adjusting the position of the welding head about a longitudinal axis, a support member adjustably carried by the welding head, a nozzle pivotally carried by the support member for guiding the electrode to the work, a guide arm extending from the support member, an actuating arm extending from the nozzle and in the same direction as the guide arm, a resilient member located between the guide arm and the actuating arm to bias the nozzle to a predetermined position, a motor cooperating with the biasing means for oscillating the nozzle relative to the welding head and to the work to extend the area affected by the arc, and means for transmitting the oscillating motion from the motor to the nozzle, said last named means characterized by the fact that substantially no turning moment is applied to the welding head about either the transverse or the longitudinal axis.

22. In arc welding apparatus in which a welding electrode is fed by a welding head through a movable nozzle to perform a welding operation along a joint, in combination, biasing means disposed between the welding head and the nozzle for biasing the latter to a predetermined position, an actuating motor mounted independently of the welding head, a flexible stress-resisting tube secured at one end to the welding head and at the other end to the actuating motor, an arm reciprocally operable by the actuating motor, and a connecting member secured at one end to the nozzle and at the other end to the arm for transmitting the movement of the arm in cooperation with the biasing means to the nozzle to oscillate it across the joint to be welded.

23. Arc welding apparatus comprising, in combination, feeding means for a welding electrode, guiding means for the welding electrode pivotally mounted relative to the feeding means, actuating means secured to the guiding means, stress resisting means secured in fixed position relative to the feeding means, resilient means interposed between the actuating means and the stress resisting means for biasing the guiding means to a predetermined position, a motor, additional stress resisting means secured in fixed position relative to the motor, a flexible stress resisting tube secured between said stress resisting means, additional actuating means having driving connection with the motor, and a tension wire extending through the stress resisting tube and connected at the ends to the actuating means for cooperating with the resilient means to oscillate the guiding means on operation of the motor.

GUSTAV H. KOCH.